United States Patent

Shimazaki

[11] Patent Number: 5,832,122
[45] Date of Patent: Nov. 3, 1998

[54] METHOD OF PROCESSING IMAGE DATA

[75] Inventor: Osamu Shimazaki, Kanagawa-ken, Japan

[73] Assignee: Fuji Photo Film Co., Ltd., Kanagawa, Japan

[21] Appl. No.: 616,340

[22] Filed: Mar. 15, 1996

[30] Foreign Application Priority Data

Mar. 24, 1995 [JP] Japan .................................. 7-065647
Mar. 30, 1995 [JP] Japan .................................. 7-073293

[51] Int. Cl.$^6$ ...................................................... H04N 1/40
[52] U.S. Cl. ........................ 382/237; 358/456; 358/457; 358/406; 382/270
[58] Field of Search ..................................... 358/429–430, 358/456–460, 534–536, 298, 466–467, 406, 504; 382/270–272, 237; 395/109

[56] References Cited

U.S. PATENT DOCUMENTS

| | | | |
|---|---|---|---|
| 4,984,283 | 1/1991 | Sakano | 382/28 |
| 5,166,809 | 11/1992 | Surbrook | 358/456 |
| 5,526,021 | 6/1996 | Naylor, Jr. | 358/456 |
| 5,729,663 | 3/1998 | Lin et al. | 395/109 |
| 5,748,785 | 5/1998 | Mantell et al. | 382/237 |

FOREIGN PATENT DOCUMENTS

| | | | |
|---|---|---|---|
| 53540 | 1/1993 | Japan | H04N 1/40 |
| 6311352 | 11/1994 | Japan | H04N 1/40 |

*Primary Examiner*—David K. Moore
*Assistant Examiner*—Stephen Brinich
*Attorney, Agent, or Firm*—Sughrue, Mion, Zinn, Macpeak & Seas, PLLC

[57] ABSTRACT

When threshold data of a threshold matrix are to be established, they are determined in an ascending or descending order so as to maximize the distance between the thresholds in the threshold matrix and other identical threshold matrixes positioned in surrounding relation thereto. After all the thresholds are established, multivalued image data are converted into binary image data using the threshold matrix. A halftone dot image produced on the basis of the binary image data is of a highly accurate nature free from dot gains.

17 Claims, 13 Drawing Sheets

| | | 3B | | 25 | | | 3B | | 25 | | | 3B | | 25 |
|---|---|---|---|---|---|---|---|---|---|---|---|---|---|---|
| | 3A | | | | | 3A | | | | | 3A | | | |
| | 24 | | 2 | | | 24 | | 2 | | | 24 | | 2 | |
| | | | 23B | | | | | 23B | | | | | 23B | |
| 1 | | 23A | | | 1 | | 23A | | | 1 | | 23A | | |
| | | 3B | | 25 | | | 3B | | 25 | | | 3B | | 25 |
| | 3A | | | | | 3A | | | | | 3A | | | |
| | 24 | | 2 | | | 24 | | 2 | | | 24 | | 2 | |
| | | | 23B | | | | | 23B | | | | | 23B | |
| 1 | | 23A | | | 1 | | 23A | | | 1 | | 23A | | |
| | | 3B | | 25 | | | 3B | | 25 | | | 3B | | 25 |
| | 3A | | | | | 3A | | | | | 3A | | | |
| | 24 | | 2 | | | 24 | | 2 | | | 24 | | 2 | |
| | | | 23B | | | | | 23B | | | | | 23B | |
| 1 | | 23A | | | 1 | | 23A | | | 1 | | 23A | | |

FIG. 12

| 7 | 7 | 4 | 5 | 6 | 7 | 7 | 4 | 5 | 6 | 7 | 7 | 4 | 5 | 6 |
|---|---|---|---|---|---|---|---|---|---|---|---|---|---|---|
| 5 | 4 | 5 | 7 | 6 | 5 | 4 | 5 | 7 | 6 | 5 | 4 | 5 | 7 | 6 |
| 6 | 5 | 7 | 9 | 8 | 6 | 5 | 7 | 9 | 8 | 6 | 5 | 7 | 9 | 8 |
| 8 | 6 | 6 | 8 | 8 | 8 | 6 | 6 | 8 | 8 | 8 | 6 | 6 | 8 | 8 |
| 9 | 7 | 5 | 6 | 8 | 9 | 7 | 5 | 6 | 8 | 9 | 7 | 5 | 6 | 8 |
| 7 | 7 | 4 | 5 | 6 | 7 | 7 | 4 | 5 | 6 | 7 | 7 | 4 | 5 | 6 |
| 5 | 4 | 5 | 7 | 6 | 5 | 4 | 5 | 7 | 6 | 5 | 4 | 5 | 7 | 6 |
| 6 | 5 | 7 | 9 | 8 | 6 | 5 | 7 | 9 | 8 | 6 | 5 | 7 | 9 | 8 |
| 8 | 6 | 6 | 8 | 8 | 8 | 6 | 6 | 8 | 8 | 8 | 6 | 6 | 8 | 8 |
| 9 | 7 | 5 | 6 | 8 | 9 | 7 | 5 | 6 | 8 | 9 | 7 | 5 | 6 | 8 |
| 7 | 7 | 4 | 5 | 6 | 7 | 7 | 4 | 5 | 6 | 7 | 7 | 4 | 5 | 6 |
| 5 | 4 | 5 | 7 | 6 | 5 | 4 | 5 | 7 | 6 | 5 | 4 | 5 | 7 | 6 |
| 6 | 5 | 7 | 9 | 8 | 6 | 5 | 7 | 9 | 8 | 6 | 5 | 7 | 9 | 8 |
| 8 | 6 | 6 | 8 | 8 | 8 | 6 | 6 | 8 | 8 | 8 | 6 | 6 | 8 | 8 |
| 9 | 7 | 5 | 6 | 8 | 9 | 7 | 5 | 6 | 8 | 9 | 7 | 5 | 6 | 8 |

FIG. 13
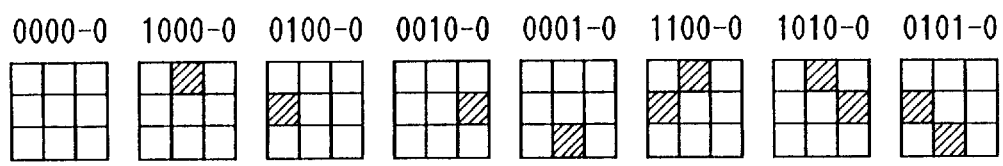
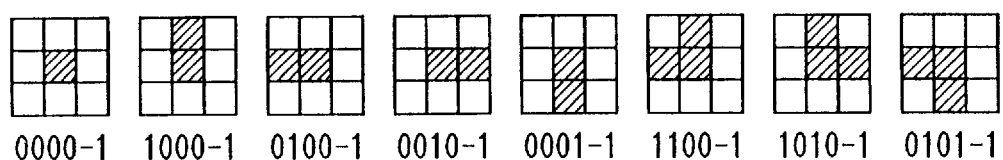
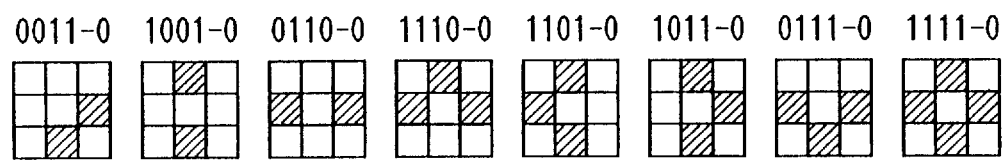
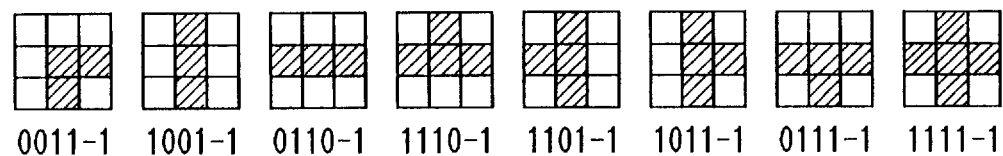

METHOD OF PROCESSING IMAGE DATA

BACKGROUND OF THE INVENTION

1. Field of the Invention

The present invention relates to a method of processing multivalued image data by converting the multivalued image data into binary image data to produce a halftone dot image.

2. Description of the Related Art

There have widely been employed output devices, typically laser printers, for converting multivalued image data into binary image data using predetermined threshold data, and selectively turning on and off a laser beam based on the produced binary image data thereby to form a halftone dot image with gradations on an output medium.

Generally, gradations of tone of halftone dot images can be expressed by either one of two processes. One of the processes is referred to as an amplitude modulation process (AM process) by which the size of dots or pixels is modulated according to multivalued image data. According to the other process, which is referred to as a frequency modulation process (FM process), the size of dots remains unchanged, but the density of dots is modulated according to multivalued image data. There are mainly two types of the frequency modulation process, i.e., an error distributing process and a threshold process. According to the error distributing process, when multivalued image data are to be converted into binary image data using predetermined threshold data, errors produced between the multivalued image data and the binary image data are distributed into surrounding pixels, generating binary image data having desired densities. According to the threshold process, multivalued image data are converted into binary image data using threshold data that are established as a dither matrix.

A conventional threshold process employs a distributed dither matrix (known as a Bayer's dither matrix) corresponding to each region of an image that is divided into a plurality of blocks. This conventional threshold process tends to allow undesirable regular patterns to be visually noticed in a reproduced halftone dot image.

The conventional threshold process is also disadvantageous in that since it does not take into account the effect of a dot gain of an output device or medium for outputting an image, a halftone dot image reproduced by the conventional threshold process is degraded if the dot gain is large. Specifically, a laser beam in a laser printer used as an output device for forming a halftone dot image has a beam spot which is either circular or elliptical in shape, and the laser intensity of the beam spot is of a normal distribution. Consequently, the laser beam is liable to blur surrounding pixels that are recorded, failing to reproduce accurate gradations of tone in a halftone dot image. An output medium on which a halftone dot image is to be reproduced also has a dot gain such as blurring of a blackened area and blurring of an ink, causing gradation errors.

According to a method disclosed in Japanese laid-open patent publication No. 6-311352, a dither matrix comprises an array of numbers arranged in rows and columns, and the numbers arrayed in the direction of either rows or columns are greater than the numbers arrayed in the other direction of columns or rows. The numbers arrayed in the other direction are rearranged randomly in each of blocks into which an image is divided. In this manner, an undesirable regular pattern produced by the repetition of the dither matrix is made less visually recognizable, and the storage capacity of a memory for storing the dither matrix is reduced.

However, the disclosed method is unable to completely eliminate the regular pattern, and cannot avoid an image degradation due to a dot gain depending on an output device used, as with the process using the Bayer's dither matrix. In addition, the disclosed method is more time-consuming than the process using the Bayer's dither matrix because it is necessary to rearrange repeatedly the numbers arrayed in the other direction.

Japanese laid-open patent publication No. 5-3540 reveals one error distributing process in which when multivalued image data are to be converted into binary image data, a dot generating pattern (binarizing pattern) is determined in advance with respect to those pixels which surround a pixel in question, an error caused by the binarizing process is corrected using a corrective value corresponding to the dot generating pattern which is stored in a pattern table memory, and the corrected error is used as a new error for error distribution.

The proposed process is capable of establishing accurate corrective values with respect to ideal dot generating patterns such as a circular dot generating pattern, and hence of reproducing good images with those ideal dot generating patterns. However, this process is applicable to not all output devices and output mediums which have output characteristics and various dot gain characteristics depending on beam spot configurations, etc. Furthermore, the proposed process requires a considerable processing time because it is an error distributing process.

SUMMARY OF THE INVENTION

It is a general object of the present invention to provide a method of processing image data at high speed to produce high-quality images taking into account visual characteristics and dot gains of output devices and output mediums.

A major object of the present invention is to determine the positions of thresholds in a sequence to maximize the distance between those positions in a threshold matrix for increasing the spatial frequency of an error which is caused when multivalued image data are converted into binary image data using the threshold matrix, and also to take into account the positions of thresholds in surrounding threshold matrixes in determining the positions of thresholds in the threshold matrix, for thereby reducing the visibility of a periodic pattern produced by a repetition of threshold matrixes.

Another object of the present invention is to use a point spread function produced in view of visual characteristics as a weighting filter and successively determine the positions of thresholds in order to minimize the variation of a weighting distribution which is produced by causing the weighting filter to act primarily on the positions of thresholds that have already been determined, for thereby producing a threshold matrix capable of reducing the visibility of an undesirable granularity in a produced image.

Still another object of the present invention is to determine thresholds in view of surrounding threshold matrixes for thereby reducing the visibility of a periodic pattern produced by discrete surrounding thresholds.

Yet still another object of the present invention is to determine the positions of thresholds in view of the distances between the thresholds in highlight and shadow regions of thresholds, and determine the positions of thresholds using predetermined weighting filters in an intermediate region of thresholds, for thereby producing a threshold matrix for making any granularity and periodic patterns less visually recognizable in the entire range of a produced image.

A further object of the present invention is to generate test patterns using an output device or an output medium which is actually used, measure the densities or halftone dot area percentages of the test patterns, determine effective gradation incremental data from the differences between the measured densities or halftone dot area percentages and an ideal density or an ideal halftone dot area percentage, and convert multivalued image data into binary image data using the gradation incremental data for thereby generating a highly accurate gradation data in view of gradation increases due to surrounding pixels.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a diagram of a threshold array and thresholds of 3 established therein;

FIG. 7 is a diagram of a threshold array and thresholds established therein alternately in ascending and descending orders in a method of processing image data according to a second embodiment of the present invention;

FIG. 12 is a diagram of a threshold array on which the weighting filter has acted in the method of processing image data according to the third embodiment;

FIG. 13 is a diagram of test patterns in a method of processing image data according to a fifth embodiment of the present invention;

DETAILED DESCRIPTION OF THE PREFERRED EMBODIMENTS

Figure 1:
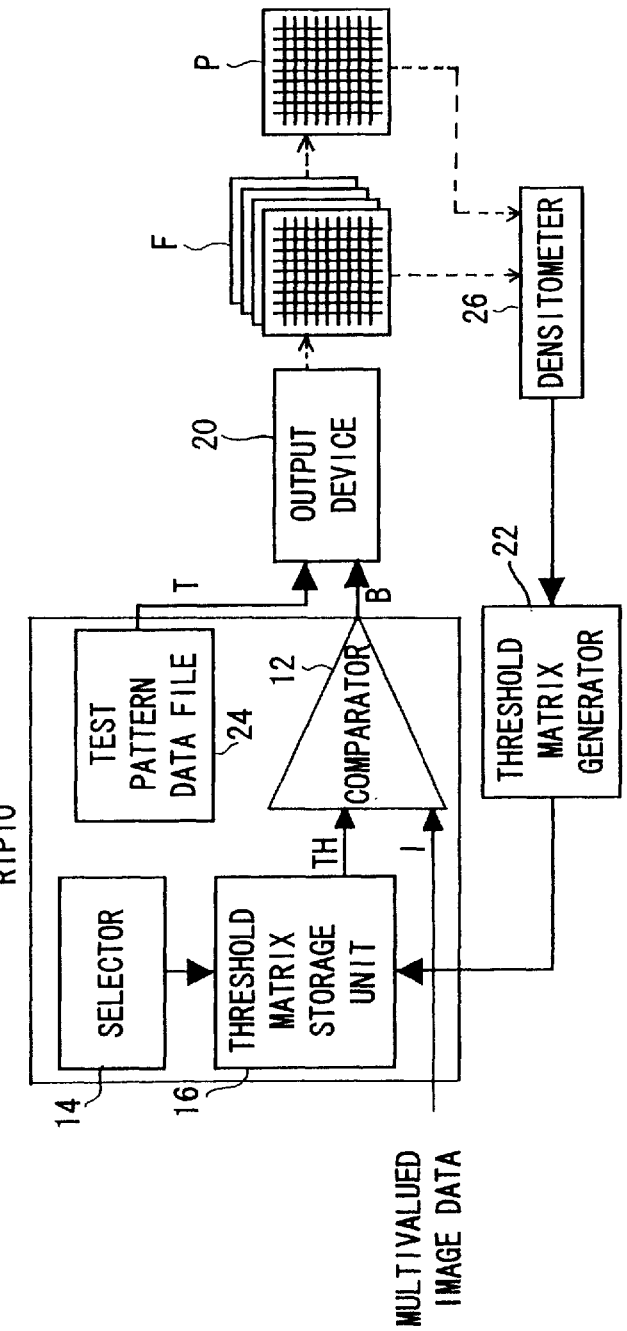
FIG. 1 is a block diagram of a system to which a method of processing image data according to the present invention is applied.

FIG. 1 shows in block form a system to which a method of processing image data according to the present invention is applied.

First, a process of producing a printed document P is generated in the system shown in FIG. 1 will be described below.

Multivalued image data I inputted from an external device to a raster image processor (RIP) 10 are supplied to a comparator 12. The comparator 12 compares the supplied multivalued image data I with threshold data TH which have been selected by a selector 14 based on output conditions including a screen ruling, an output medium, etc. and outputted from a threshold matrix storage unit 16, and converts the multivalued image data I into binary image data B. The threshold data TH are generated by a threshold matrix generator 22 in a manner described later on. The threshold matrix generator 22 may be integrally combined with the raster image processor 10. The binary image data B are supplied to an output device 20 such as a laser printer. Based on the supplied binary image data B, the output device 20 selectively turns on and off a laser beam to form a halftone dot image on a photographic film F, producing an original film plate. From the original film plate, there is produced a printing plate which is then set in a printing press (not shown) to form a desired printed document P that comprises a printing sheet as a recording medium with a halftone dot image formed thereon.

Various embodiments of a process of generating threshold matrixes (halftone screens) which are used to produce the original film plate or the printed document P will be described below. In the following embodiments, thresholds ranging from 1 to 25 are established in the threshold matrixes. However, the principles of the present invention are also applicable to establishing thresholds in any desired numerical range in threshold matrixes.

Figure 2:
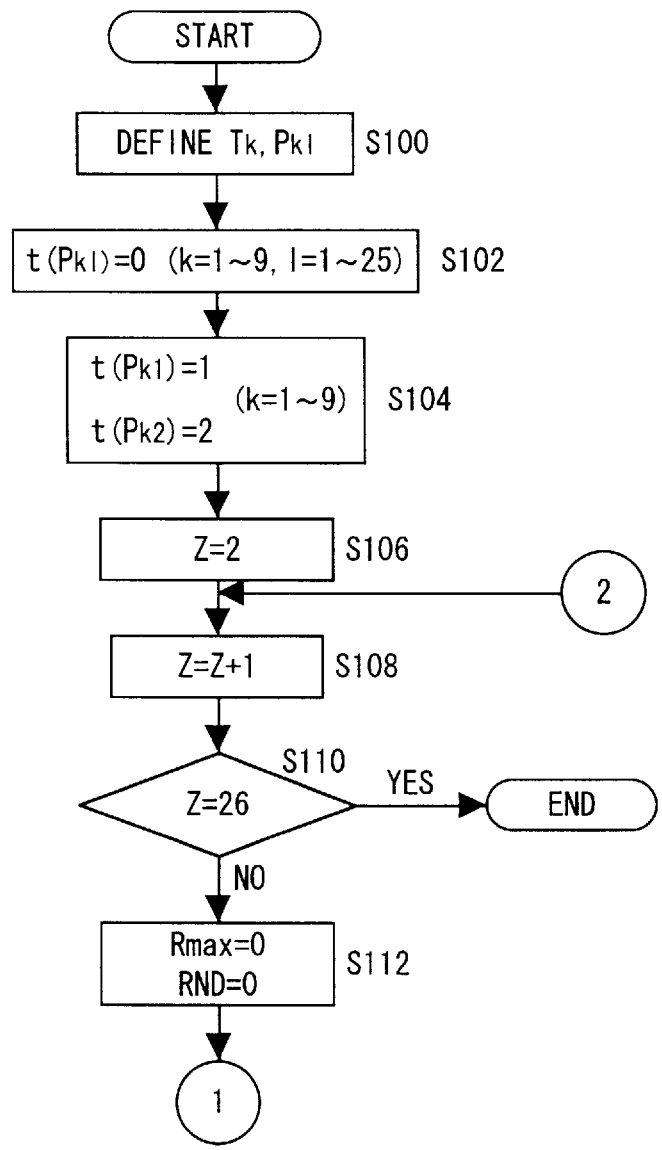
FIG. 2 is a flowchart of a method of processing image data according to a first embodiment of the present invention.
Figure 3:
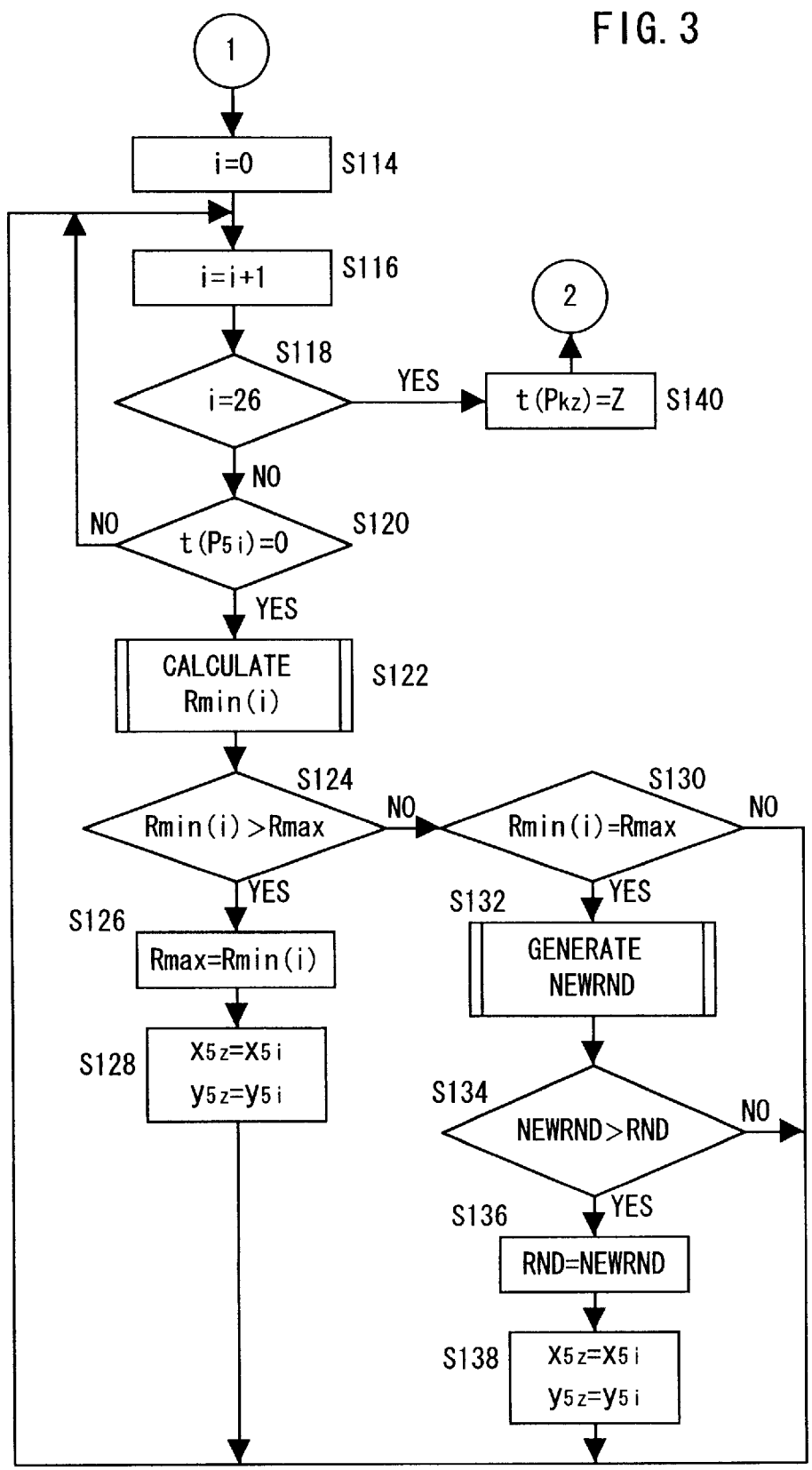
FIG. 3 is a flowchart of the method of processing image data according to the first embodiment.
Figure 4:
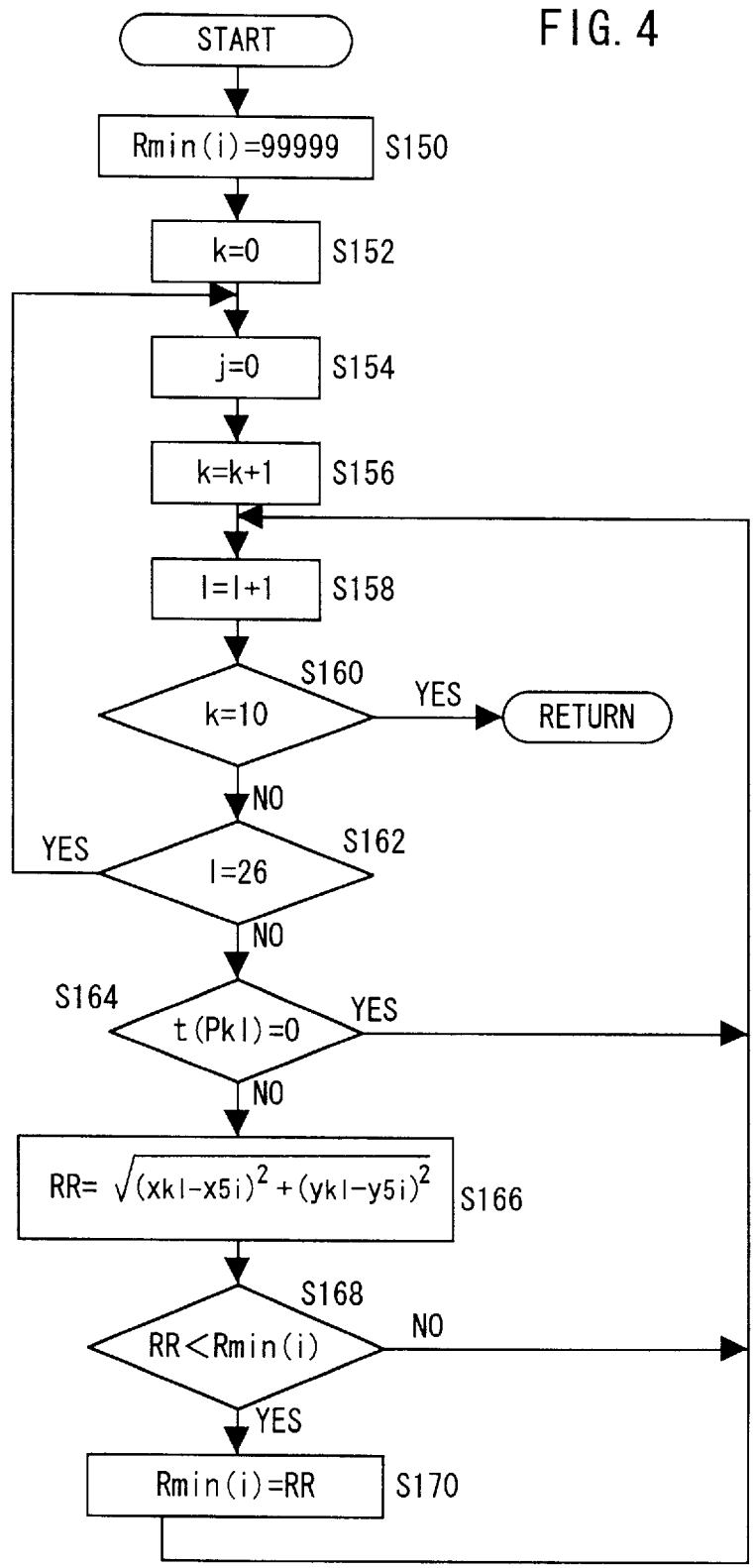
FIG. 4 is a flowchart of the method of processing image data according to the first embodiment.

1st Embodiment:

FIGS. 2 through 4 are flowcharts of a processing sequence of a method of processing image data according to a first embodiment of the present invention. According to the first embodiment, threshold matrixes are generated such that thresholds having close values are not positioned closely to each other, so that halftone dots of an image which is formed by the threshold matrixes are not unduly localized, thus lowering the granularity of a reproduced halftone dot image. The thresholds in a threshold matrix are arranged in view of other threshold matrixes established adjacent thereto for thereby preventing a regular pattern from being produced by a repetition of threshold matrixes.

Figure 5:
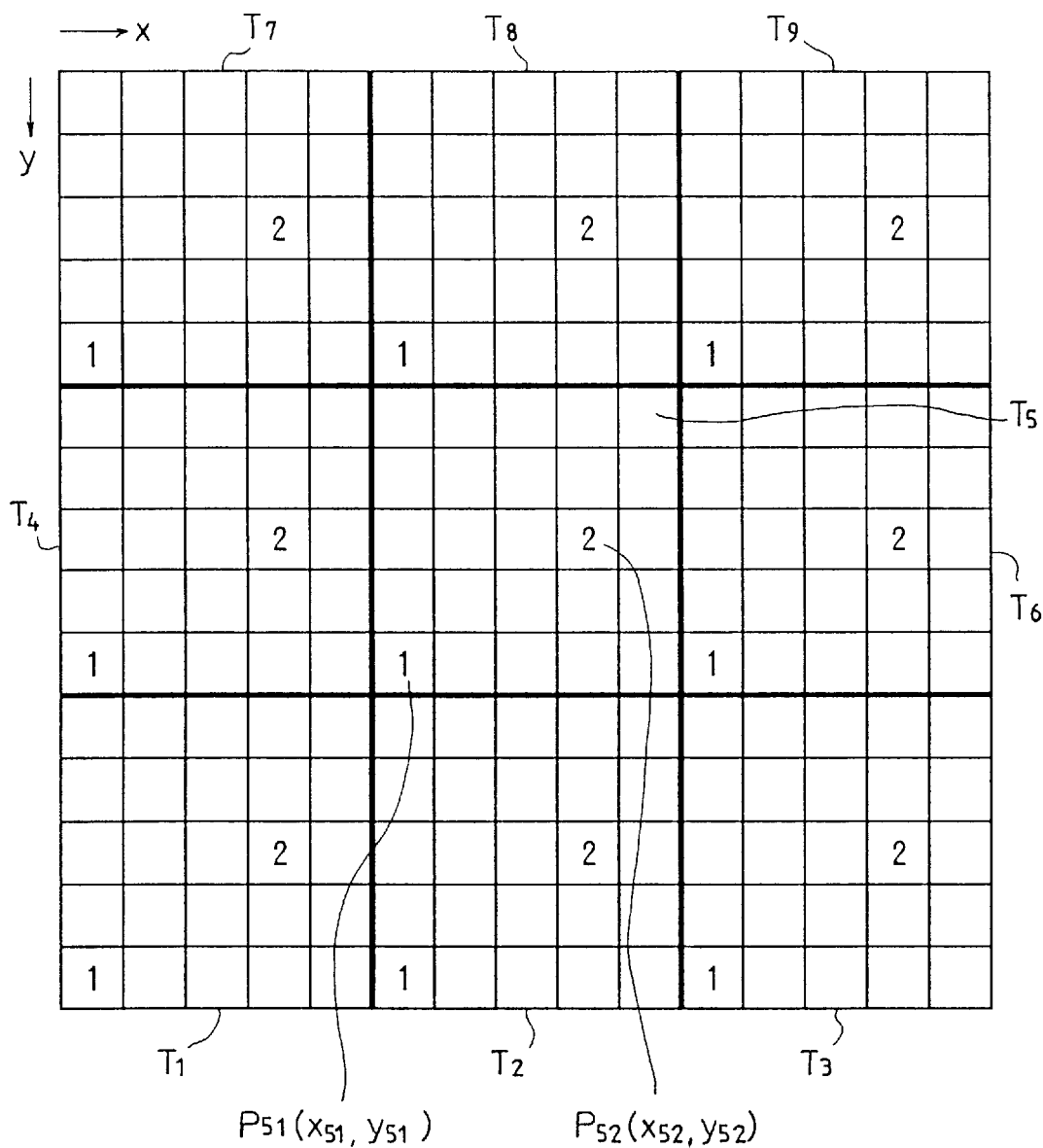
FIG. 5 is a diagram of a threshold array and initial thresholds established therein.

As shown in FIG. 5, a threshold array $T_5$ which is a desired threshold matrix, and surrounding threshold arrays $T_1 \sim T_4$, $T_6 \sim T_9$ each of the same arrangement as the threshold array $T_5$ are defined, and pixel points $P_{k1}$ having respective 25 thresholds $t(P_{k1})$ (k=1~9, l=1~25, t=1~25) which make up each of the threshold arrays $T_k$ (k=1~9) are defined in a step S100 shown in FIG. 2. The thresholds $t(P_{k1})$ have x coordinates $x_{k1}$ and y coordinates $y_{k1}$.

Then, all the thresholds $t(P_{k1})$ of the threshold arrays $T_k$ are set to 0 in a step S102. Thereafter, two pixel points $P_{k1}$, $P_{k2}$ which are spaced from each other by a suitable distance are selected from each of the threshold arrays $T_k$, and their thresholds are set to initial values $t(P_{k1})=1$, $t(P_{k2})=2$ in a step S104 (see FIG. 5).

Then, pixel points $P_{k1}$ whose thresholds $t(P_{k1})$ are to be set to 3 through 25 are determined as follows:

First, a threshold $t(P_{k1})$ (=z) is set to z=3, a maximum value Rmax of the distance between two pixel points $P_{k1}$ to Rmax=0, a random number RND to RND=0, and a variable i (i=1~(z−1)) to i=1 in steps S106, S108, S112 shown in FIG. 2 and steps S114, S116 shown in FIG. 3. If a threshold $t(P_{5i})$ is 0 in a step S120, then a minimum value Rmin (i) of the distances between the corresponding pixel point $P_{5i}$ and surrounding pixel points $P_{k1}$ whose thresholds $t(P_{k1})$ have already been established is determined in a step S122.

The minimum value Rmin (i) can be determined according to a flowchart shown in FIG. 4. In FIG. 4, after the minimum value Rmin (i) is set to an initial value of 99999 in a step S150, steps S152, S154, S156, S158, S160, S162 are carried out, and then a pixel point $P_{k1}$ whose threshold $t(P_{k1})$ is set to other than 0 is extracted in a step S164. The distance RR between the extracted pixel point $P_{k1}$ and the pixel point $P_{5i}$ is determined according to the following equation (1) in a step 166:

$$RR = \sqrt{(x_{k1} - x_{5i})^2 + (y_{k1} + y_{5i})^2} \qquad (1)$$

Then, the distance RR thus determined and the minimum value Rmin (i) are compared with each other in a step S168. If RR<Rmin (i), then the minimum value Rmin (i) is set to the distance RR in a step S170. The above process is effected on all the pixel points $P_{k1}$ whose thresholds $t(P_{k1})$ are not 0, thereby determining the minimum value Rmin (i) of the distances between the pixel point $P_{5i}$ and surrounding pixel points $P_{k1}$ whose thresholds $t(P_{k1})$ have already been established.

Referring back to FIG. 3, the minimum value Rmin (i) thus determined and the maximum value Rmax are compared with each other in steps S124, S130. If i=1, then since the maximum value Rmax is 0 (see the step S112), the maximum value Rmax is set to Rmax=Rmin (i) in a step S126, and thereafter the x and y coordinates $x_{5z}$, $y_{5z}$ are set to $x_{5z}=x_{5i}$, $y_{5z}=y_{5i}$ in a step S128. Thereafter, the variable i is incremented in the step S116, a minimum value Rmin (i) is determined again in the step S122, and the minimum value Rmin (i) and a maximum value Rmax updated in the step S126 are compared with each other in the steps S124, S130.

As long as Rmin (i)>Rmax in the step S124, the x and y coordinates $x_{5z}$, $y_{5z}$ for setting the threshold $t(P_{5i})$ to 3 (z=3) are successively incremented. Through the above process, it is possible to determine x and y coordinates $x_{5z}$, $y_{5z}$ which are spaced from any pixel points $P_{k1}$ whose thresholds $t(P_{k1})$ have already been established.

Figure 6:
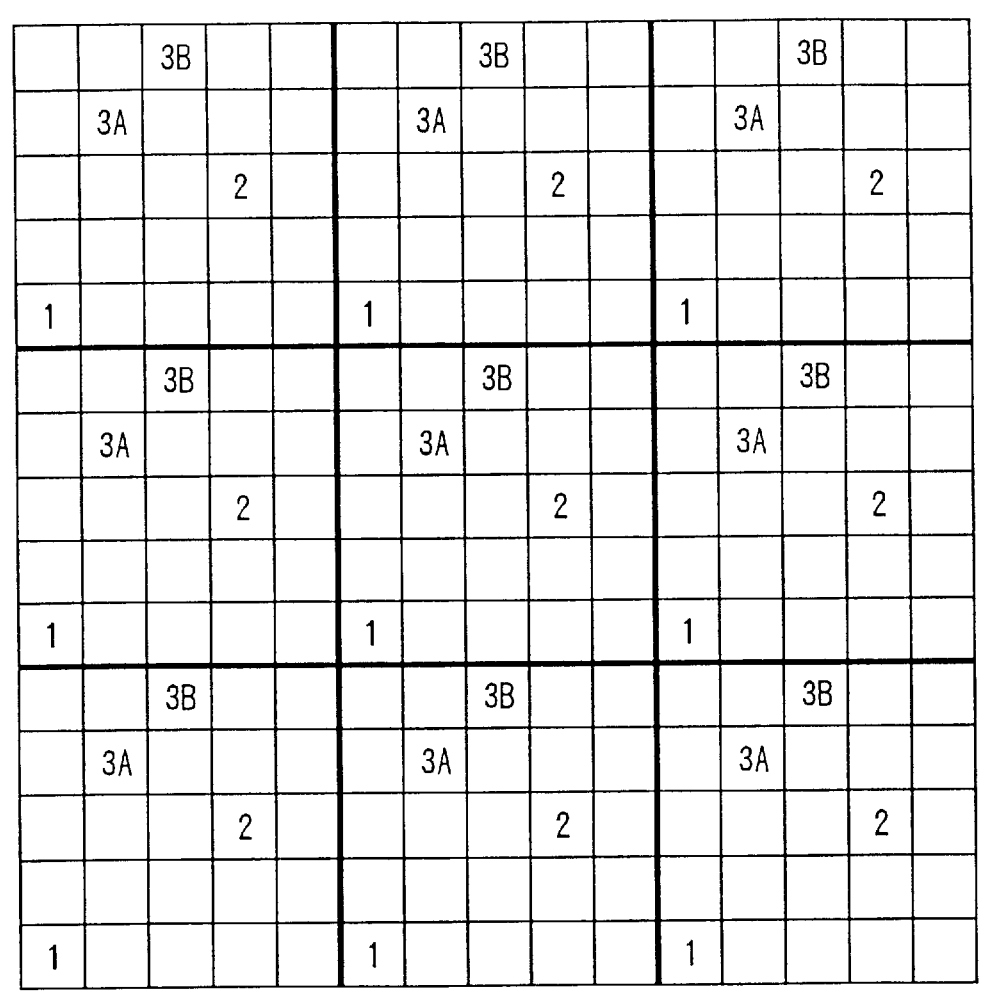

If Rmin (i)=Rmax in the step S130, then there are two or more pixel points $P_{5i}$ that are spaced by equal distances from the pixel points $P_{k1}$ whose thresholds $t(P_{k1})$ have already been established, as shown in FIG. 6. For example, two pixel points $P_{5i}$ whose thresholds $t(P_{5i})$ are indicated by 3A, 3B in FIG. 6. In this case, a random number NEWRND which can have a value of either 0 or 1 is determined in a step S132, and compared with the random number RND established in the step S112 in a step S134. If NEWRND>RND, then the random number RND is set to RND=NEWRND in a step S136, and then x and y coordinates $x_{5i}$, $y_{5i}$ that are subsequently determined are equalized to the x and y coordinates $x_{5z}$, $y_{5z}$ for which the threshold $t(P_{5i})$ is set to 3 (z=3) in a step S138. If NEWRND≦RND, then x and y coordinates $x_{5i}$, $y_{5i}$ that are determined at first are equalized to the x and y coordinates $x_{5z}$, $y_{5z}$ for which the threshold $t(P_{5i})$ is set to 3 (z=3). As a result, either one of the pixel points 3A, 3B shown in FIG. 6 is randomly selected as being represented by the x and y coordinates $x_{5z}$, $y_{5z}$ for which the threshold $t(P_{5i})$ is to be set to 3 (z=3).

In this manner, it is possible to extract a pixel point $P_{5z}$ which is spaced the largest distance from other pixel points $P_{k1}$ whose thresholds $t(P_{k1})$ have already been established, from among all the pixel points $P_{51}$ in the threshold array $T_5$. A threshold $t(P_{kz})$ is set to 3 (z=3) for pixel points $P_{kz}$ of threshold arrays $T_k$ which contain the pixel point $P_{5z}$ in steps S118, S140.

The step S108 is repeated, and thresholds $t(P_{k1})$ are set to 4~25, thereby establishing the thresholds $t(P_{k1})$ with respect to all the pixel points $P_{k1}$ in the threshold arrays $T_k$ in a step S110.

From the threshold arrays $T_k$ thus determined, only the threshold array $T_5$ is extracted and stored as a threshold matrix in the threshold matrix storage unit 16 shown in FIG. 1.

In the raster image processor 10 shown in FIG. 1, the selector 14 selects the threshold matrix (threshold array $T_5$) from the threshold matrix storage unit 16, and supplies its threshold data TH (corresponding to the threshold $t(P_{51})$) to the comparator 12. The comparator 12 compares the supplied threshold data TH with the multivalued image data I, thereby generating binary image data B. The binary image data B are outputted as a halftone dot image on a photographic film F by the output device 20, and a printed document P is produced from the photographic film F.

Since the threshold matrixes are generated such that thresholds having close values are not positioned closely to each other, halftone dots of an image which is formed by the threshold matrixes are not unduly localized. Therefore, it is possible to produce a halftone dot image with a reduced degree of granularity. In the threshold matrix, the thresholds are arranged in view of other surrounding threshold matrixes such as the threshold arrays $T_1$~$T_4$, $T_6$~$T_9$ shown in FIG. 5. Accordingly, a halftone dot image is of a good quality, free of a regular pattern which would otherwise be produced by a repetition of threshold matrixes.

2nd Embodiment:

A method of processing image data according to a second embodiment of the present invention will be described below.

In the first embodiment, a threshold $t(P_{k1})$ is set to successive numerical values in an ascending order, e.g., it is set successively to 1, 2, . . . . When a threshold $t(P_{k1})$ is to be set to a large numerical value, since the thresholds $t(P_{k1})$ of most pixel points $P_{k1}$ have already been established, mutually close pixel points $P_{k1}$ may have to be selected.

According to the second embodiment, as shown in FIG. 7, four pixel points $P_{k1}$, $P_{k2}$, $P_{k24}$, $P_{k25}$ which are spaced from each other by a suitable distance are selected from each of the threshold arrays $T_k$, and their thresholds are set to initial values $t(P_{k1})=1$, $t(P_{k2})=2$, $t(P_{k24})=24$, $t(P_{k25})=25$. Then, as with the first embodiment, a pixel point $P_{k3}$ for which a threshold $t(P_{k3})$ is set to 3 is determined, after which a pixel point $P_{k23}$ for which a threshold $t(P_{k23})$ is set to 23 is determined. In this fashion, thresholds $P_{k1}$ are set alternately, one by one, to numerical values from highlight and shadow regions, thereby establishing a threshold array $T_5$.

In the threshold array $T_5$ thus established, the thresholds $P_{k1}$ set to numerical values from highlight and shadow regions are sufficiently spaced from each other. Consequently, when a halftone dot image is generated using a threshold matrix which comprises the threshold array $T_5$, the generated halftone dot image is of a good quality, free from harshness in both the highlight and shadow regions.

Figure 8:
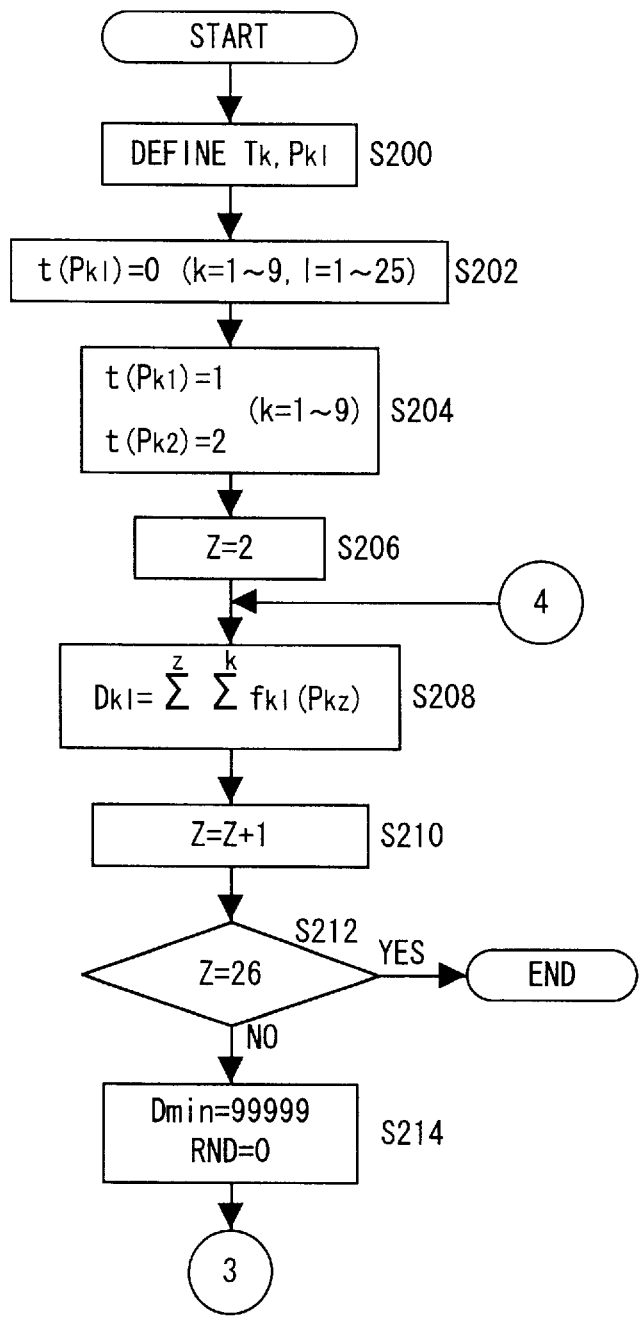
FIG. 8 is a flowchart of a method of processing image data according to a third embodiment of the present invention.
Figure 9:
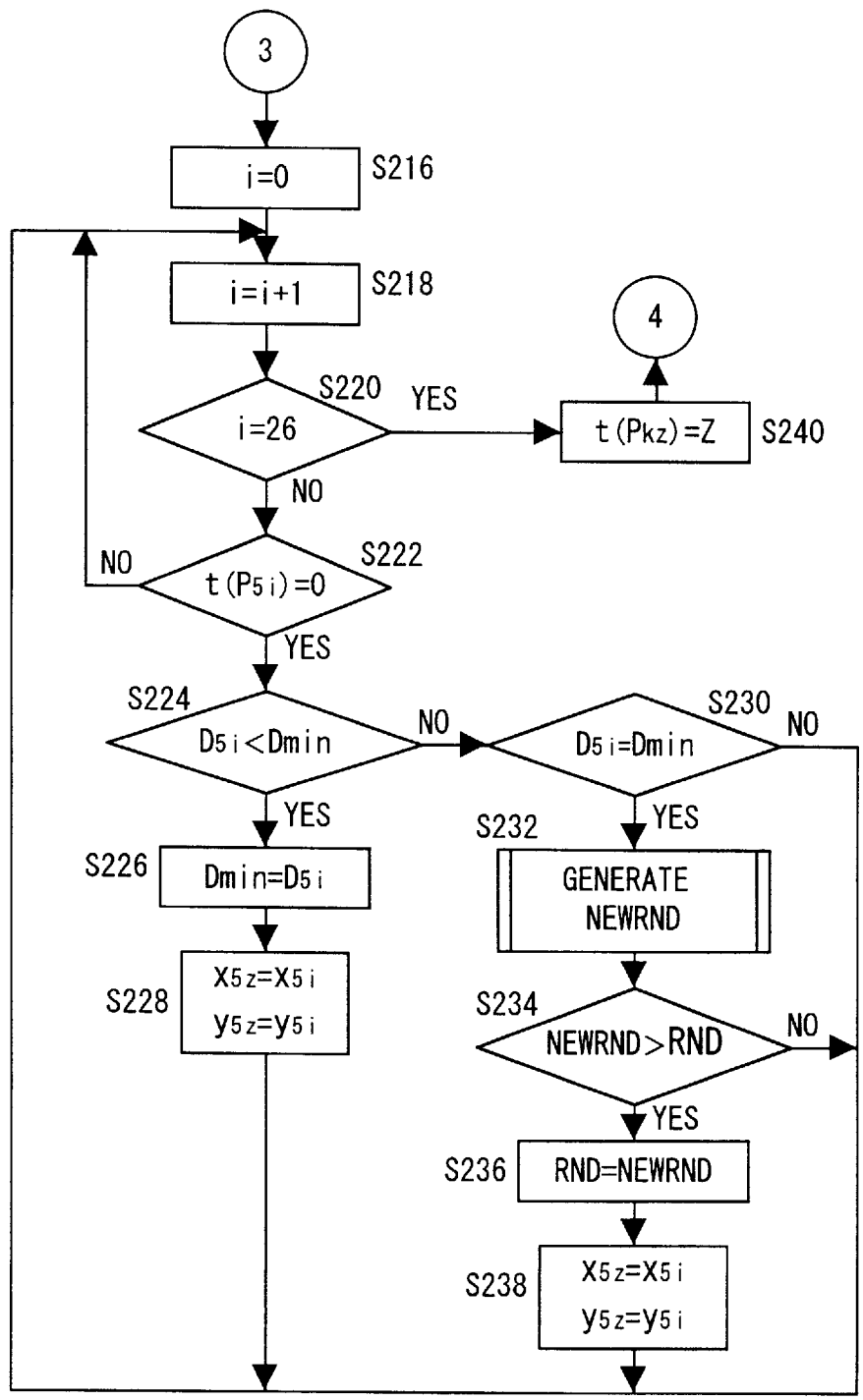
FIG. 9 is a flowchart of the method of processing image data according to the third embodiment.
Figures 14, 15:
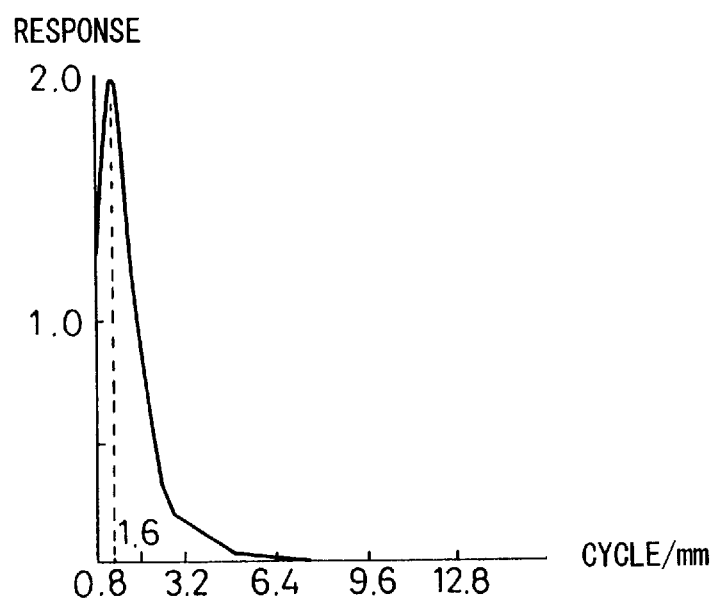
FIG. 14 is a diagram showing a pixel in question and surrounding pixels in a test pattern in the method of processing image data according to the fifth embodiment.
FIG. 15 is a diagram illustrative of visual spatial frequency characteristics (MTF).

3rd Embodiment:

FIGS. 8 and 9 are illustrative of a method of processing image data according to a third embodiment of the present invention. According to the third embodiment, visual spatial frequency characteristics (MTF) shown in FIG. 15 are subjected to a two-dimensional Fourier transform to determine a visual point spread function shown in FIG. 10, and the visual point spread function is caused to act on positions corresponding to the positions of thresholds to effect accumulative addition or subtraction of weighted values for thereby determining a hypothetical distribution of densities of an image produced by the thresholds. By establishing threshold matrixes in order to minimize the variation of the hypothetical distribution of densities, an unwanted granularity is reduced. Furthermore, the thresholds in the threshold matrix are arranged in view of other threshold matrixes established adjacent to the threshold matrix for thereby preventing a regular pattern from being produced by a discrete repetition of threshold matrixes.

First, as with the first embodiment, threshold arrays $T_k$ and pixel points $P_{kl}$ (k=1~9, l=1~25) are defined in a step S200 shown in FIG. 8. After all the thresholds $t(P_{kl})$ are set to 0 in a step S202, two pixel points $P_{k1}$, $P_{k2}$ which are spaced from each other by a suitable distance are selected from each of the threshold arrays $T_k$, and their thresholds are set to initial values $t(P_{k1})=1$, $t(P_{k2})=2$ in a step S204 (see FIG. 8).

Figures 10, 11:
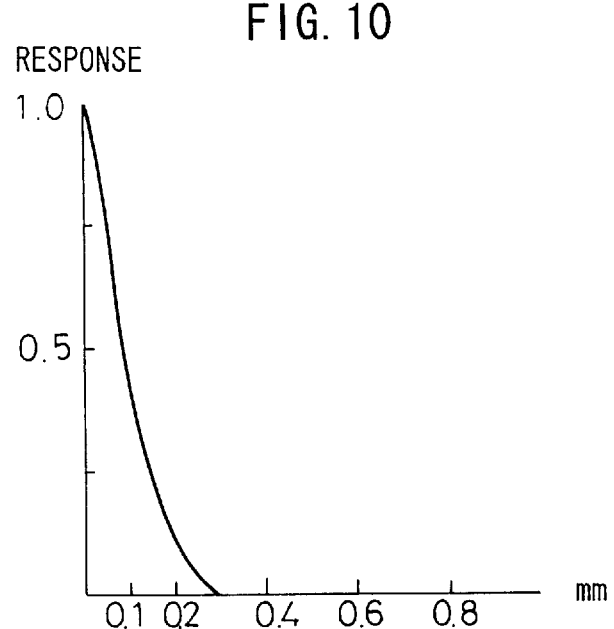
FIG. 10 is a diagram illustrating a visual point spread function in the method of processing image data according to the third embodiment.
FIG. 11 is a diagram illustrating a weighting filter in the method of processing image data according to the third embodiment.

Then, a threshold $t(P_{k1})$ (=z) is set to z=2 in a step S206, and a weighting filter $f_{k1}(P_{kz})$ shown in FIG. 11 is caused to act on the threshold arrays $T_k$ shown in FIG. 5, determining density distributions $D_{K1}$ of the weighted threshold arrays $T_k$ shown in FIG. 12 in a step S208.

Specifically, the weighting filter $f_{k1}(P_{kz})$ shown in FIG. 11 is a representation of the distribution of the visual point spread function shown in FIG. 10 as a two-dimensional density distribution that comprises a 5×5 matrix. The weighting filter $f_{k1}(P_{kz})$ is caused to act mainly on the pixel points $P_{k1}$ of the threshold arrays $T_k$ for which the thresholds $t(P_{k1})$ are established, and the weighted values are added to produce a density distribution $D_{k1}$ shown in FIG. 12. By successively establishing the thresholds $t(P_{k1})$ to minimize the variation of the density distribution $D_{k1}$, i.e., to achieve the minimum value thereof in this case, any undesirable granularity can be minimized.

First, a threshold $t(P_{k1})$ (=z) is set to z=3, a minimum value Dmin of a density distribution $D_{k1}$ to Dmin=99999, a random number RND to RND=0, and a variable i (i=1~(z−1)) to i=1 in steps S210, S214 shown in FIG. 8 and steps S216, S218 shown in FIG. 9. If a threshold $t(P_{5i})$ is 0 in a step S222, then a density distribution $D_{5i}$ of the corresponding pixel point $P_{5i}$ and the minimum value Dmin are compared with each other in steps S224, S230. Since the minimum value Dmin is 9999 when the variable i is i=1 in the step S214, the minimum value Dmin is set to $D_{5i}$ in a step S226, and the x and y coordinates $x_{5z}$, $y_{5z}$ are set to $x_{5z}=x_{5i}$, $y_{5z}=y_{5i}$ in a step S228. Thereafter, the variable i is incremented in the step S218, and the density distribution $D_{5i}$ and the minimum value Dmin are compared with each other again in the steps S224, S230.

Then, those steps S224~S238 which are the same as the steps S124~S138 in the first embodiment shown in FIG. 3 are carried out to extract a pixel point $P_{5z}$ (corresponding to the position of a numeral 4) of the lowest density from the density distribution $D_{k1}$ shown in FIG. 12. A threshold $t(P_{kz})$ is set to 3 (z=3) for pixel points $P_{kz}$ of threshold arrays $T_k$ which contain the pixel point $P_{5z}$ in steps S220, S240.

The step S208 is repeated, and thresholds $t(P_{k1})$ are set to 4~25, thereby establishing the thresholds $t(P_{k1})$ with respect to all the pixel points $P_{k1}$ in the threshold arrays $T_k$ in a step S212.

From the threshold arrays $T_k$ thus determined, only the threshold array $T_5$ is extracted and stored as a threshold matrix in the threshold matrix storage unit 16 shown in FIG. 1, as with the first embodiment.

Since the thresholds in the threshold matrixes thus generated are arranged to minimize any undesirable granularity, they can produce a good-quality halftone-dot image. Because the thresholds are arranged in view of other surrounding threshold matrixes, a halftone dot image produced thereby is of a good quality, free of a regular pattern which would otherwise be produced by a repetition of threshold matrixes.

In the third embodiment, as with the second embodiment, thresholds $P_{k1}$ may be set alternately, one by one, to numerical values from highlight and shadow regions, for producing a better-quality halftone dot image. Furthermore, the density distribution $D_{k1}$ may be determined by accumulative subtraction, rather than accumulative addition, of weighting filters $f_{k1}(P_{kz})$.

4th Embodiment:

A method of processing image data according to a fourth embodiment of the present invention will be described below.

In the third embodiment, the weighting filters $f_{k1}(P_{kz})$ depending on the visual perception are of a finite magnitude, and minimum and maximum values may not uniquely be determined even when a density distribution $D_{k1}$ is determined and hence the position of a suitable threshold may not be determined in highlight and shadow regions where thresholds are spaced from each other by a distance greater than a range in which the weighting filters $f_{k1}(P_{kz})$ act.

According to the fourth embodiment, thresholds $t(P_{k1})$ are established by the method according to the first embodiment (see FIGS. 2 and 3) in a highlight region ($0<t(P_{k1}) \leq TH_W$) thereof, by the method according to the third embodiment (see FIGS. 8 and 9) in an intermediate region ($TH_W<t(P_{k1}) \leq TH_B$) thereof, and by the method according to the first embodiment in a shadow region ($TH_B<t(P_{k1}) \leq TH_{MAX}$) thereof. The thresholds $TH_W$, $TH_B$, $TH_{MAX}$ are related to each other by the relationship: $0<TH_W<TH_B<TH_{MAX}$, and the threshold $TH_{MAX}$ represents a maximum value of the thresholds $t(P_{k1})$.

According to the fourth embodiment, it is possible to generate threshold matrixes for producing a halftone dot image with no undesirable granularity and periodic patterns in the entire threshold range from the highlight region to the shadow region.

In the fourth embodiment, thresholds $P_{k1}$ may be set alternately, one by one, to numerical values from the highlight and shadow regions, for producing a better-quality halftone dot image.

5th Embodiment:

A method of processing image data according to a fifth embodiment of the present invention will be described below. According to the fifth embodiment, the beam configuration of a laser beam outputted by the output device 20 and the dot gains of output mediums including the photographic film F and the printed document P are taken into consideration when the photographic film F and the printed document P are produced, and the weighting filters $f_{k1}(P_{kz})$ in the third embodiment are corrected by a microscopic gradation increase that is brought about depending on the status of surrounding pixels thereby to generate threshold matrixes, so that a halftone dot image with corrected dot gains can be produced.

A process of determining dot gain correcting quantities Cor ($Q_1$, $Q_2$, $Q_3$, $Q_4$) which are effective gradation incremental data will be described below.

Test patterns each composed of 3×3 pixels as shown in FIG. 13 are produced on the photographic film F or the printed document P by the output device 20 (see FIG. 1) based on test data T supplied from a test pattern data file 24 in the raster image processor 10. Each of the test patterns is measured for density by a densitometer 26. As shown in FIG. 14, correcting quantities Cor ($Q_1$, $Q_2$, $Q_3$, $Q_4$) are then determined based on density differences with respect to ON (black) and OFF (white) states of surrounding pixels $Q_1, Q_2, Q_3, Q_4$ when a central pixel Q in question changes from an OFF state to an ON state. Of the nine pixels shown in FIG. 14, those four pixels other than the pixels Q, $Q_1, Q_2, Q_3, Q_4$ are uniformly of an ON or OFF state. In FIG. 13, the pixels Q, $Q_1, Q_2, Q_3, Q_4$ are represented by 0 when they are of an OFF state, and by 1 when they are of an ON state. ON/OFF patterns of the pixels Q, $Q_1, Q_2, Q_3, Q_4$ are expressed by strings of 1 s and 0 s, arranged in the configuration "$Q_1$ $Q_2$ $Q_3$ $Q_4$–Q." For example, an ON/OFF pattern of the pixels is indicated by "$Q_1$ $Q_2$ $Q_3$ $Q_4$–Q"="0000-1."

Densities D1 of the ON/OFF patterns "$Q_1$ $Q_2$ $Q_3$ $Q_4$–1" and densities D2 of the ON/OFF patterns "$Q_1$ $Q_2$ $Q_3$ $Q_4$–2" are measured by the densitometer 26. Then, the threshold matrix generator 22 determines the differences between the densities D1, D2 as dot percentage differences $\Delta(\%)$ between the test patterns. Specifically, if the photographic film F or the printed document P has a base density Db before any image is recorded thereon and has a maximum density Dmax when it is entirely black, then the dot percentage differences $\Delta(\%)$ can be determined as follows:

$$\Delta = \frac{10^{-Db} - 10^{-D1}}{10^{-Db} - 10^{-Dmax}} - \frac{10^{-Db} - 10^{-D0}}{10^{-Db} - 10^{-Dmax}} \quad (2)$$

$$= \frac{10^{-D0} - 10^{-D1}}{10^{-Db} - 10^{-Dmax}}.$$

Inasmuch as an ideal dot percentage difference R free from dot gains in the test patterns shown in FIG. 13 is expressed by:

$$R = 100/9 \ (\%) \quad (3)$$

the correcting quantities Cor ($Q_1, Q_2, Q_3, Q_4$) can be determined as:

$$Cor \ (Q_1, Q_2, Q_3, Q_4) = \Delta/R - 1 \quad (4)$$

The correcting quantities Cor ($Q_1, Q_2, Q_3, Q_4$) thus determined are supplied to the threshold matrix generator 22, which then generates threshold matrixes substantially in the same manner as with the third embodiment.

Specifically, the correcting quantities Cor ($Q_1, Q_2, Q_3, Q_4$) act on weighting filters $f_{k1}(P_{k2})$ with respect to thresholds $t(P_{k1})$, $t(P_{k2})$ set to initial values $t(P_{k1})=1$, $t(P_{k2})=2$. Because the thresholds of the pixels surrounding the pixels having the thresholds $t(P_{k1})$, $t(P_{k2})$ are 0 as shown in FIG. 5, the correcting quantities Cor ($Q_1, Q_2, Q_3, Q_4$) for a density pattern in which only those pixels having the thresholds $t(P_{k1})$, $t(P_{k2})$ are blackened on the photographic film F or the printed document P become correcting quantities Cor (0, 0, 0, 0, 0) produced from the test patterns "0000-0" and "0000-1" shown in FIG. 13.

A weighting filter $f_{k1}(P_{k2})$ corrected in view of the dot gains is produced when the elements of the weighting filter $f_{k1}(P_{k2})$ are multiplied by 1+Cor (0, 0, 0, 0, 0).

Using the corrected weighting filter $f_{k1}(P_{k2})$, the step S208 and following steps shown in FIGS. 8 and 9 are carried out to determine a pixel point $P_{k1}$ for which a threshold $t(P_{k3})$ is set to $t(P_{k3})=3$, in the step S240. Similarly, weighting filters $f_{k1}(P_{k2})$ for pixel points $P_{k1}$ for which thresholds $t(P_{k1})$ are established are corrected in view of the dot gains, and the step S208 and following steps shown in FIGS. 8 and 9 are carried out again to generate desired threshold matrixes.

The threshold matrixes are thus generated depending on the output device 20 and the output mediums, and then stored in the threshold matrix storage unit 16 shown in FIG. 1. The selector 14 selects a desired threshold matrix from the threshold matrix storage unit 16, and binary image data B are generated from the multivalued image data I using the selected threshold matrix. The binary image data B are then outputted as a halftone dot image on the photographic film F by the output device, and a printed document P is produced from the photographic film F with the halftone dot image recorded thereon.

The threshold matrixes have been corrected for a microscopic gradation increase due to surrounding pixels in view of the characteristics of the output device depending on the beam spot configuration of the laser beam and the dot gains of the output mediums. Consequently, the halftone dot images on the photographic film F and the printed document P are generated as highly accurate gradation images. As with the third embodiment, since the thresholds are arranged depending on visual characteristics, it is possible to produce good-quality halftone dot images free from undesirable granularity. The thresholds in a threshold matrix are arranged in view of other surrounding threshold matrixes for thereby producing better-quality halftone dot images free from a regular pattern which would be caused by a repetition of threshold matrixes, as with the first embodiment. Inasmuch as the dot gains depending on output mediums including the photographic film F and the printed document D are corrected, it is possible to produce highly accurate halftone dot images with no visually recognizable granularity.

In the fifth embodiment, gradation incremental data are determined by measuring the densities of the test patterns. However, halftone dot area percentages of the test patterns may be measured to determine gradation incremental data.

In the above embodiment, a microscopic gradation increase caused under the influence of surrounding pixels is corrected for the generation of threshold matrixes. According to an error distributing process, multivalued image data are compared with given threshold data to produce binary image data, and an error caused when the binary image data are produced is taken into account when next binary image data are produced. In such an error distributing process, the error may be corrected by the gradation incremental data based on predetermined ON/OFF patterns of surrounding pixels. In this fashion, it is possible to produce halftone dot images having highly accurate gradations by a binarizing process according to the error distributing process.

In the fifth embodiment, as with the second embodiment, thresholds may be set alternately, one by one, to numerical values from highlight and shadow regions, for producing a better-quality halftone dot image.

While two initial values are established for thresholds in each of the above embodiments, only one initial value may be established for a threshold.

In the fifth embodiment, 16 test patterns are generated to determine gradation incremental data, as shown in FIG. 13. However, one of horizontally or vertically symmetrical sets of test patterns may be dispensed with, and gradation incremental data may be determined from 8 or 4 test patterns. Depending on the accuracy which is desired, gradation incremental data may be determined from one test pattern.

With the present invention, as described above, thresholds are established in a sequence of distances between pixels which make up a threshold matrix, for producing a good-quality binary image with no localized dots. In establishing the thresholds, the positions of pixel points of other surrounding threshold matrixes are taken into account, so that the produced binary image is free of a periodic pattern caused by a repetition of threshold matrixes.

Furthermore, a visual point spread function obtained from visual characteristics is used as a weighting filter, and the weighting filter is caused to act primarily on the positions of thresholds which have already been determined. Thresholds are determined successively from regions where a weighting distribution obtained by accumulative addition or subtraction of weighted values is minimum. With the thresholds thus determined, it is possible to produce a good-quality binary image free from granularity and periodic patterns.

In highlight and shadow regions of thresholds, the positions of thresholds are determined in view of the distances between the thresholds. In an intermediate region of thresholds, the positions of thresholds are determined using predetermined weighting filters. Therefore, any granularity and periodic patterns are less visually recognizable in the entire range of a produced image.

When test patterns are generated using a desired output device or a desired output medium, it is possible to determine highly accurate gradation incremental data depending on output characteristics of the output device such as a recording beam spot configuration or the dot gain thereof. When threshold data for use in converting multivalued image data into binary image data are generated using such gradation incremental data or an error caused by a binarizing process according to an error distributing process is corrected using such gradation incremental data, it is possible to generate high-quality halftone dot images in view of surrounding pixels.

Furthermore, when the visual point spread function is corrected by correcting quantities represented by the gradation incremental data and thereafter threshold matrixes are determined, dot gains can be corrected to generate binary images of greater accuracy.

Although certain preferred embodiments of the present invention have been shown and described in detail, it should be understood that various changes and modifications may be made therein without departing from the scope of the appended claims.

What is claimed is:

1. A method of processing image data to convert multivalued image data into binary image data, comprising the step of:
   determining threshold data of a halftone screen comprising a threshold matrix in an ascending or descending order by causing a predetermined weighting filter to act based on the positions of threshold data which have already been determined in the threshold matrix and other identical threshold matrixes positioned in surrounding relation thereto;
   effecting accumulative addition or substraction of weighted values thereby to determine a weighing distribution by the weighting filter in said threshold matrix; and
   establishing a position corresponding to a minimum value or a maximum value of said weighing distribution as the position of new threshold data, whereby the positions of threshold data can be successively determined.

2. A method according to claim 1, further comprising the steps of:
   producing a plurality of test patterns having respective pixels in question and surrounding pixels which are of ON and OFF states, on an output medium;
   measuring densities or halftone dot area percentages of each of said test patterns to determine correcting values depending on the ON and OFF states of the surrounding pixels;
   then, associating said correcting values with the positions of threshold data which have already been determined in the threshold matrix and the other identical threshold matrixes positioned in surrounding relation thereto; and
   thereafter, causing said weighing filter to act on said correcting values based on the positions of threshold data which have already been determined.

3. A method according to claim 1, wherein said weighting filter comprises a point spread function obtained from visual characteristics.

4. A method according to claim 1, wherein said positions are determined in the ascending order of the threshold data, in the descending order of the threshold data, or alternately in the ascending and descending orders of the threshold data.

5. A method according to claim 1, wherein if there are at least two positions of the new threshold data to be established, then the positions of new threshold data to be established are determined using random numbers.

6. A method according to claim 2, wherein if there are at least two positions of the new threshold data to be established, then the positions of new threshold data to be established are determined using random numbers.

7. A method of processing image data to convert multivalued image data into binary image data, comprising the step of:
   determining threshold data of a halftone screen comprising a threshold matrix in an ascending or descending order by determining the positions of new threshold data in order to maximize the distance between the positions of threshold data which have already been determined and the positions of the new threshold data, in the threshold matrix and other identical threshold matrixes positioned in surrounding relation thereto.

8. A method of processing image data to convert multivalued image data into binary image data, comprising the step of:
   determining threshold data of a halftone screen comprising a threshold matrix in an ascending or descending order by determining the positions of new threshold data in order to maximize the distance between the positions of threshold data which have already been determined and the positions of the new threshold data, in the threshold matrix and other identical threshold matrixes positioned in surrounding relation thereto in highlight and shadow regions of the thresholds, and causing a predetermined weighting filter to act primarily on the positions of threshold data which have already been determined in the threshold matrix and other identical threshold matrixes positioned in surrounding relation thereto, effecting accumulative addition or subtraction of weighted values thereby to determine a weighing distribution by the weighting filter in said threshold matrix, and establishing a position corresponding to a minimum value or a maximum value of said weighing distribution as the position of new threshold data, in an intermediate region of the thresholds, whereby the positions of threshold data can be successively determined.

9. A method according to claim 8, wherein said weighting filter comprises a point spread function obtained from visual characteristics.

10. A method according to claim 8, wherein said positions are determined in the ascending order of the threshold data, in the descending order of the threshold data, or alternately in the ascending and descending orders of the threshold data.

11. A method according to claim 8, wherein if there are at least two positions of the new threshold data to be established, then the positions of new threshold data to be established are determined using random numbers.

12. A method according to claim 11, further comprising the steps of:

produce a plurality of test patterns having respective pixels in question and surrounding pixels which are of ON and OFF states, on an output medium;

measuring densities or halftone dot area percentages of each of said test patterns to determine correcting values depending on the ON and OFF states of the surrounding pixels;

then, associating said correcting values with the positions of threshold data which have already been determined in the threshold matrix and the other identical threshold matrixes positioned in surrounding relation thereto; and thereafter, causing said weighing filter on said correcting values primarily with respect to the positions of threshold data which have already been determined.

13. A method according to claim 12, wherein said correcting values comprise gradation incremental data produced from density differences or halftone dot area percentage differences with respect to the ON and OFF states of the pixels in question when said surrounding pixels are uniformly of ON and OFF states.

14. A method of processing image data, comprising the steps of:

producing at least one set of test patterns having respective pixels in question which are of ON and OFF states and surrounding pixels which are of ON and OFF states, on an output medium;

thereafter, measuring densities or halftone dot area percentages of each of said test patterns;

determining density differences or halftone dot area percentage differences with respect to the ON and OFF states of the pixels in question when said surrounding pixels are uniformly of ON and OFF states;

generating gradation incremental data from said density differences or halftone dot area percentage differences;

correcting image data using said gradation incremental data; and forming a halftone dot image with the corrected image data on an output medium.

15. A method according to claim 14, wherein said image data comprise binary image data generated by comparing multivalued image data with threshold data, and said halftone dot image is formed on the output medium based on said binary image data.

16. A method according to claim 15, wherein said threshold data make up a threshold matrix and are arranged based on said gradation incremental data.

17. A method according to claim 15, wherein said gradation incremental data comprise correcting data for correcting said binary image data which are generated by an error distributing process.

* * * * *